Patented Jan. 5, 1954

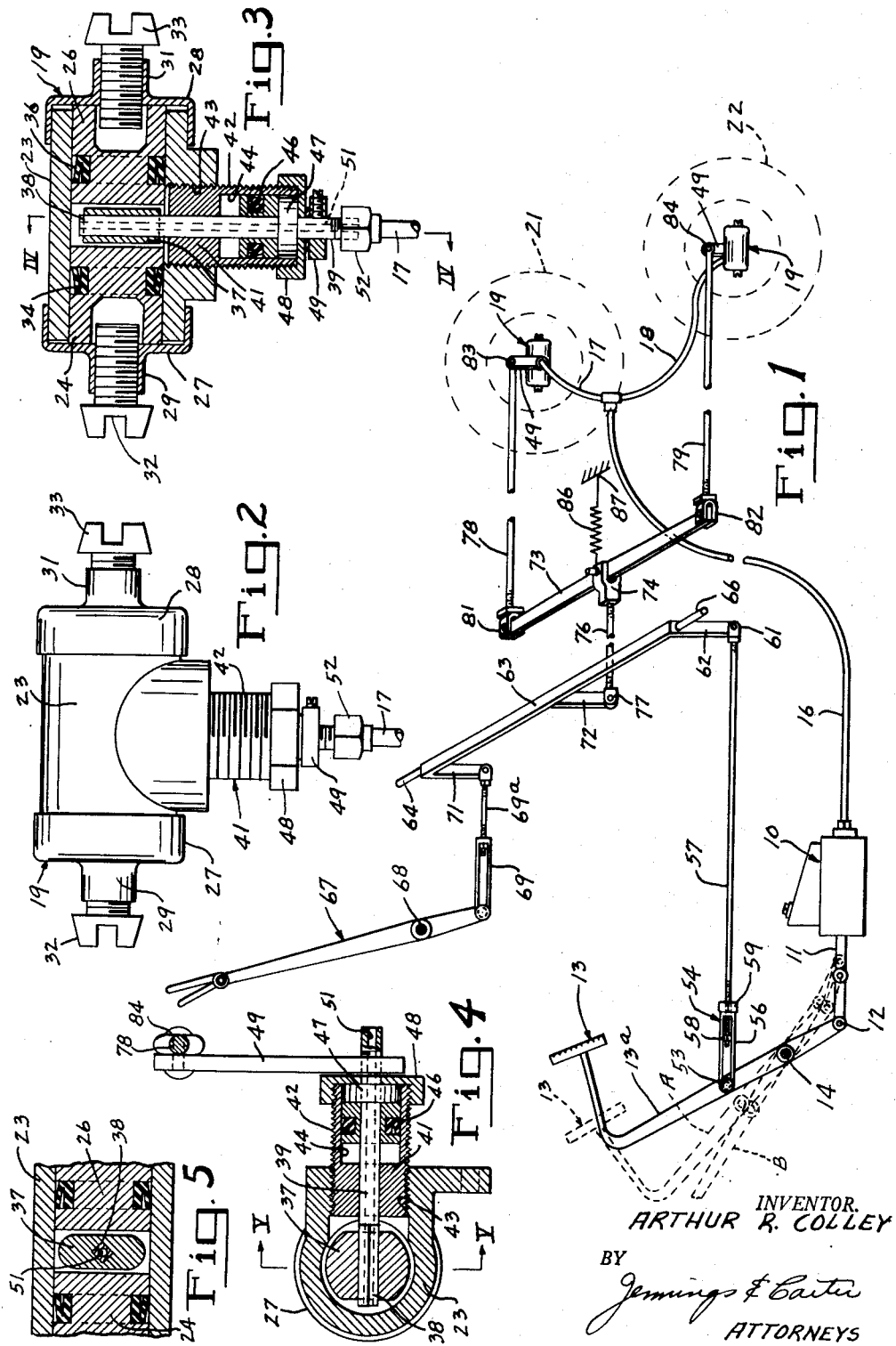

2,664,973

UNITED STATES PATENT OFFICE 2,664,973

SAFETY BRAKE SYSTEM

Arthur R. Colley, Birmingham, Ala.

Application September 14, 1950, Serial No. 184,761

1 Claim. (Cl. 188—106)

My present invention relates to brake systems for vehicles such as automobiles and has for an object the provision of a combined hydraulic and mechanical brake system in which the mechanical brake applying mechanisms thereof come into play automatically upon a failure of the pedal operated hydraulic system, and likewise upon application of the hand brake.

My invention contemplates a brake system embodying the usual fluid pressure system including a master cylinder operatively connected to a foot pedal and brake cylinders embodying one or more pistons hydraulically connected to receive fluid under pressure from the master cylinder, thus to force the piston or pistons of the brake cylinders outwardly to apply the brakes, together with mechanically actuated means disposed in the brake shoe cylinders for forcing the piston or pistons outwardly of the cylinder, similarly to apply the brakes mechanically.

My invention contemplates a system of the character designated in which each of the brake cylinders preferably comprises a pair of coaxially disposed pistons movable outwardly to apply pressure to brake bands when fluid under pressure is admitted between the pistons, in combination with a mechanically actuated cam disposed between adjacent faces of the pistons in the cylinders, and suitable linkage connecting the cam for operation both to the foot pedal used to actuate the master cylinder and to a hand operated brake.

My invention further contemplates apparatus of the character designated in which the fluid for actuating the pistons hydraulically is admitted between adjacent ends of the piston through a bored stem or shaft carrying the mechanically movable cam, thereby permitting adequate and proper sealing of the stem against loss of fluid under pressure.

Apparatus illustrating the features of my invention is shown in the accompanying drawing forming a part of this application in which:

Fig. 1 is a diagrammatic perspective view, partly broken away and illustrating a brake system embodying my improved mechanism;

Fig. 2 is a plan view of one of the brake shoe cylinders;

Fig. 3 is a sectional view of the brake shoe cylinder;

Fig. 4 is a detail sectional view taken generally along line IV—IV of Fig. 3; and, Fig. 5 is a fragmentary detail sectional view taken generally along line V—V of Fig. 4.

Referring now to the drawings for a better understanding of my invention I show my improved apparatus as embodied in a somewhat conventional brake system. As shown, the system comprises a master hydraulic cylinder 10, having its piston rod 11 pivotally connected as at 12 to a foot actuated pedal 13 pivotally mounted as at 14 in any suitable manner. Fluid under pressure is supplied through a line 16 and thence through branch hose lines 17 and 18 to my improved form of brake shoe cylinders indicated generally by the numeral 19. In the manner understood, each of the wheels of the vehicle, indicated by the dotted lines 21 and 22 is provided with one of the cylinders 19 for actuating the brakes thereof. In view of the fact that the actual operation of the brake bands against the brake drum is well known, no description or illustration thereof is deemed to be necessary for a full and complete understanding of my invention. Suffice it to say that when the foot pedal 13 is moved downwardly to the dotted line position A indicated in Fig. 1, fluid under pressure is admitted to the brake shoe cylinders 19 and actuates the parts thereof as will presently appear.

As best illustrated in Figs. 2 to 5, inclusive, each of the cylinders 19 comprises a cylinder proper 23 having therein a pair of pistons 24 and 26. The outer ends of the pistons 24 and 26 abut against members 27 and 28 slidably mounted about the exterior of the cylinder 23 and having internally threaded bosses 29 and 31. Screwed into the bosses 29 and 31 are adjusting screws 32 and 33 having slots therein as indicated to receive the brake shoes in the manner well understood. Each of the pistons 24 and 26 may be provided with rubber packing glands 34 and 36 to seal against the loss of fluid under pressure admitted to the cylinder 23.

The structure so far described and relative to the cylinders 19 is very much standard in the art. My invention comprises placing between the inner ends of the pistons 24 and 26 a cam 37 which is mounted on the squared end 38 of a rotatably mounted stem 39. The stem 39 may be journaled adjacent the cam carrying end thereof in a suitably bored member 41 exteriorly threaded as at 42 and screwed into a suitably tapped opening 43 in the wall of the cylinder 23. Surrounding the stem 39 within a recess 44 in the member 41 is a packing 46. The stem 39 may be provided with an enlargement 47 and the parts may be held assembled by means of a nut 48 threaded onto the end of the member 41. Non-rotatably secured to the outer end of the stem 39 is an actuating arm 49 by means of which the stem 39 may be rotated.

The stem 39 may be drilled to provide a continuously extending passage 51 through which fluid under pressure from the line 17 or 18 may be delivered between the inner ends of the pistons 24 and 26. The lines 17 and 18 may be connected fluid tight to the outer end of the stem by means of a nut type coupling 52.

Referring again to Fig. 1 of the drawing I pivotally mount as at 53 to the portion 13a of the foot pedal 13 a lost motion connector indicated generally by the numeral 54. The lost motion connector comprises the yoke member 56 and the pull rod 57 adjustably connected to the yoke 56 by means of nuts 58 and 59.

The rod 57 is pivotally connected as at 61 to a depending end 62 of a cross bar 63 which may be pivotally mounted on trunnions 64 and 66 to any suitable part of the vehicle framework, not shown. A hand brake lever 67, pivotally mounted as at 68 has its lower end pivotally connected through an adjustable slide link mechanism 69 to a depending end 71 at the opposite end of the bar 63.

Depending from the bar 63 intermediate its ends is an arm 72. Slidably mounted on the vehicle frame by any suitable means not shown is an equalizing bar 73. The equalizing bar is pivotally connected at its center to a clevis 74 in turn connected to a pull rod 76 which has a clevis connection 77 at its opposite end to the arm 72. Pull rods 78 and 79 are pivotally connected as at 81 and 82 to the ends of the equalizing bar. The rods 78 and 79 are pivotally connected as at 83 and 84 to the outer ends of the arms 49 carried by the stems 39. The equalizing bar 73 and hence the bar 63 are biased to the right as viewed in Fig. 1 by means of a spring 86, suitably anchored as at 87.

From the foregoing the method of constructing and using my improved brake apparatus may now be explained and understood. It will be seen that with the parts assembled in the relation shown in the drawing when the pedal 13 is moved to the dotted line position A indicated in Fig. 1 pressure is generated by the master cylinder 10 and transmitted to the brake shoe cylinders 19. This causes the pistons 24 and 26 to move outwardly, applying the brakes in the manner understood. In the event the hydraulic system is functioning properly, as for instance if there are no leaks in any of the lines or past the piston of the master cylinder or the pistons 24 and 26, the system functions as does the usual and ordinary hydraulic brake system. However, in the event of failure of any part of the hydraulic system, upon applying the brakes through the pedal 13 the pedal will move past the dotted line position A indicated in Fig. 1 to the dotted line position B indicated thereon. In its movement from the full line position to position A the rod 57 is not actuated due to the lost motion connector 54. However when the movement of pedal 13 exceeds that represented by position A, the rod 57 is pulled forwardly, rocking the cross rod 63, in turn moving the equalizing bar 73 forwardly. This pivots the stem 39, causing the cams 37 to engage the adjacent ends of the pistons 24 and 26 and move them mechanically outwardly of the cylinders, thus to apply the brakes. Thus, upon failure of any part of the hydraulic system, actuation of the pedal 13 is automatically effective to apply the same brakes mechanically through the mechanical linkage shown.

It will be noted also that through the arrangement shown I am enabled to connect the hand brake lever 67 with the cam 37. This is accomplished by providing the connector 69, which is a forwardly acting lost motion connector, namely that the connecting link 69a can move forwardly by slipping in the opening provided in the end of the member 69, thus, the mechanical actuation of the brakes through the cams 37 can be affected by the pedal 13 and also by moving the upper end of the emergency or hand brake lever 67 to the right as viewed in Fig. 1. These actions are independent of each other and the hand brake in nowise interferes with the functioning either of the hydraulic or mechanical actuation of the brakes through the foot pedal.

It will be noted that to fully apply the brakes through the medium of the cams 37 it is necessary that the pin 39 rotate only 90°. For this reason in practice I have found that I do not need a rotary type connector between the hose 17 and 18 and the threaded end of the stem. As will be appreciated the hose 18 and 19 may well be flexible members and I have found that rotation through 90° is not enough to damage the hose. I thus eliminate a rotary seal at the point of connection of the stem with the hose.

From the foregoing it will be apparent that I have devised an improved safety brake system in which the failure of the hydraulic portion thereof automatically brings into play mechanical means for applying the brakes. My invention thus differs from other prior devices in that I have interposed the cam 37 directly between the inner ends of the pistons 24 and 26. By drilling the stem 39 to admit the hydraulic fluid between the pistons and by the provision of the cam therebetween, I eliminate the necessity of a spring for biasing the pistons outwardly. Heretofore, a spring between the pistons was necessary in order to assure that the pistons did not close the fluid admitting port entering the side wall of the cylinder. My invention is characterized by its simplicity and positiveness of operation, and by the inclusion in the hydraulic wheel brake system a mechanical hand brake. As will be appreciated, most hand brakes have heretofore been of the type connected to a friction drum or plate carried on the propeller shaft of the automobile or other motorized vehicle. My invention is readily adaptable without major change to existing wheel and brake structures and therefore lends itself readily to inclusion in existing automobile brake structures without undue difficulties.

While I have shown my invention in but one form, it will be obvious to those skilled in the art that it is not so limited, but is susceptible of various changes and modifications without departing from the spirit thereof and I desire therefore, that only such limitations shall be placed thereupon as are specifically set forth in the appended claim.

What I claim is:

The combination with a brake system embodying a hydraulic brake shoe cylinder having a pair of pistons movable axially within the cylinder to apply the brake and a cam in the cylinder between said pistons and engageable with adjacent ends thereof to move the pistons axially within the cylinder to brake applying position, of a rotatable actuating stem carrying the cam and extending through the wall of the cylinder, there being an axially disposed opening through said stem for supplying fluid under pressure into the cylinder between the pistons, a foot operated hydraulic pressure means operable to supply fluid under pressure to the cylinder through said stem when moved through a given distance, a lost motion connector pivotally mounted on said foot operated means, and mechanical means connecting said stem to said lost motion connector and operable to rotate said cam when said foot operated means is moved more than said given distance.

ARTHUR R. COLLEY.

References Cited in the file of this patent

UNITED STATES PATENTS

| Number | Name | Date |
|---|---|---|
| 1,696,729 | Rackham | Dec. 25, 1928 |
| 1,724,127 | Christensen | Aug. 13, 1929 |
| 2,116,882 | Dickey | May 10, 1938 |
| 2,136,398 | Schreyer | Nov. 15, 1938 |
| 2,201,612 | Fields | May 21, 1940 |

FOREIGN PATENTS

| Number | Country | Date |
|---|---|---|
| 629,575 | Germany | Aug. 21, 1934 |